Patented May 12, 1942

2,282,379

UNITED STATES PATENT OFFICE 2,282,379

NEW INSOLUBLE MONAZO COMPOUNDS

Maurice Arthur Thorold Rogers and Wilfred Archibald Sexton, Blackley, Manchester, England, assignors to Imperial Chemical Industries Limited, a corporation of Great Britain No Drawing. Original application June 22, 1938, Serial No. 215,268. Divided and this application January 28, 1941, Serial No. 376,334. In Great Britain June 23, 1937

7 Claims. (Cl. 260—158)

This invention relates to new water-insoluble monazo compounds which comprise as one component the radical of an arylene-thiazyl-methyl ketone of the benzene or naphthalene series and as the other component the radical of a diazotized arylamine which is devoid of water-solubilizing groups, such as sulfonic acid and carboxyl and especially to new azo dyes and to fibers dyed with the new compounds. More particularly the coupling components of the new compounds are represented in general by the formula

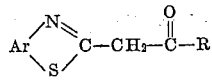

in which Ar stands for an ortho-arylene radical of the benzene or naphthalene series which may or may not be substituted, but if substituted it may not carry groups inducing solubility in water, such as carboxylic or sulfonic acid groups. The symbol

represents an acyl radical of the aliphatic or aromatic series, such as acetyl, benzoyl and nitro-benzoyl.

The new insoluble azo compounds are obtained by coupling a diazotized arylamine which is devoid of groups inducing solubility in water with the above-identified coupling components, the coupling being carried out so that the azo compound is formed either in substance or on a substratum such as cotton fiber. The colors thus obtained are insoluble compounds having yellow to orange shades and good fastness properties.

The invention will be more fully set forth in the following more detailed description which includes examples that are given as illustrative embodiments of the invention and not as limitations thereof. Parts are expressed in parts by weight unless otherwise noted.

Example I 10 parts of acetonyl-benzthiazole are mixed with 20 parts of Turkey red oil, 250 parts of boiling water are added, followed by 20 parts of aqueous caustic soda 60° Tw. The clear solution is diluted with cold water to make 1000 parts by volume.

Cotton cloth is impregnated with the above solution, dried, and developed by immersion in a bath made as follows:

10 parts of 4-chloro-2-methyl-aniline hydrochloride are dissolved in 200 parts of cold water containing 10 parts of hydrochloric acid 32° Tw. The solution is cooled to 12° C. and 4 parts of sodium nitrite dissolved in 20 parts of cold water are slowly added.

After standing for 30 minutes the solution is made neutral to Congo red indicator paper by the addition of about 7.5 parts of sodium acetate dissolved in 15 parts of cold water.

10 parts of acetic acid 50% are then added and the solution diluted with 750 parts of water.

After development the fabric is rinsed in cold water, soaped at the boil, rinsed and dried. The cotton was dyed a bright greenish-yellow shade which had moderate to good general fastness properties, being unusually fast to chlorine and to soda-kier-boiling.

The compound is represented by the formula

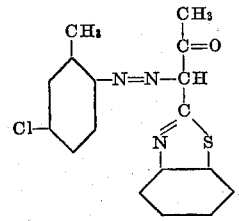

Any diazotizable primary arylamine which is devoid of groups which induce solubility can be used as the diazo component, and any of the above indicated class of coupling components can be used.

The invention is illustrated further by the following examples which are dyeings on cotton that were made similarly to the process described in Example I except that different components were used.

| Example | Coupling component | Diazo component | Shade | Fastness |
|---|---|---|---|---|
| II | 2-acetonyl-benz-thiazole | 5-chloro-2-amino-toluene | Greenish yellow | Moderate. |
| III | ---do--- | 4-chloro-2-amino-anisole | Red yellow | Fairly good. |
| IV | 2-acetonyl-alpha-naphtho-thiazole | 4-chloro-2-amino-anisole | ---do--- | Good. |
| V | ---do--- | 4-benzoyl-amino-2, 5-diethoxy-aniline | Novel orange | Moderate. |
| VI | 5-chloro-4-methyl-2-acetonyl-benz-thiazole | 4-chloro-2-amino-anisole | Red yellow | Good. |
| VII | ---do--- | 2-chloro-aniline | Green yellow | Do. |
| VIII | ---do--- | 3-chloro-aniline | ---do--- | Do. |
| IX | 6-chloro-4-methyl-2-acetonyl-benz-thiazole | 2, 5-dichloro-aniline | ---do--- | Do. |
| X | ---do--- | 5-chloro-2-amino-toluene | ---do--- | Do. |
| XI | 6-ethoxy-2-acetonyl-benz-thiazole | 4-chloro-2-amino-anisole | Greenish yellow | Do. |
| XII | ---do--- | 2-chloro-aniline | Green yellow | Do. |
| XIII | ---do--- | 3-chloro-aniline | ---do--- | Do. |
| XIV | ---do--- | 2, 5-dichloro-aniline | ---do--- | Do. |
| XV | ---do--- | 5-chloro-2-amino-toluene | ---do--- | Do. |
| XVI | Alpha-(2'-benz-thiazyl)-aceto-phenone | 4-chloro-2-amino-anisole | Dull yellow | Moderate. |
| XVII | ---do--- | 2-chloro-aniline | Green yellow | Good. |
| XVIII | ---do--- | 3-chloro-aniline | ---do--- | Do. |
| XIX | ---do--- | 2, 5-dichloro-aniline | ---do--- | Do. |
| XX | ---do--- | 5-chloro-2-amino-toluene | ---do--- | Do. |
| XXI | 6-chloro-2-acetonyl-benz-thiazole | 2-chloro-aniline | ---do--- | Do. |
| XXII | ---do--- | 3-chloro-aniline | ---do--- | Do. |
| XXIII | ---do--- | 3-chloro-aniline | ---do--- | Do. |
| XXIV | 6-chloro-2-acetonyl-benz-thiazole | 5-chloro-2-amino-toluene | ---do--- | Do. |
| XXV | 2-acetonyl-benz-thiazole-5-carboxylic acid-anilide | 2-chloro-aniline | ---do--- | Very good. |
| XXVI | ---do--- | 5-chloro-2-amino-toluene | ---do--- | Do. |

The fastness properties indicated in Examples II to XXVI are the general fastness properties, namely fastness to light, washing, chlorine and soda-kier-boiling.

A preferred type is that in which the ortho-arylene radical of the coupling component is from the benzene series and the acyl radical is acetyl. In this type there is a desirable uniformity of fastness properties.

This application is a division of our application Serial No. 215,268, Patent 2,233,873, issued March 4, 1941.

From the foregoing disclosure it will be recognized that the invention is susceptible of modification without departing from the spirit and scope thereof and it is to be understood that the invention is not restricted to the specific illustrations thereof herein set forth.

We claim:

1. A water-insoluble azo compound represented by the formula

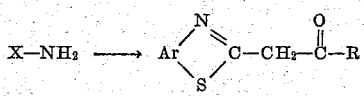

in which X—NH2 is a primary arylamine of the benzene series which is devoid of groups which induce solubility in water; Ar is an ortho-arylene radical of the group consisting of the benzene and naphthalene series which are devoid of groups which induce solubility in water; and —CO—R is an acyl group.

2. A compound in accordance with claim 1 in which R is CH3.

3. A compound in accordance with claim 1 in which Ar is an ortho-arylene radical of the benzene series.

4. A compound in accordance with claim 1 in which the second component is a 2-acetonyl-benzthiazole.

5. The compound represented by the formula

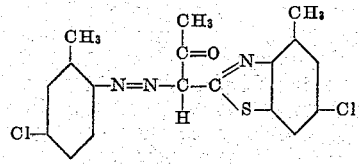

6. The compound represented by the formula

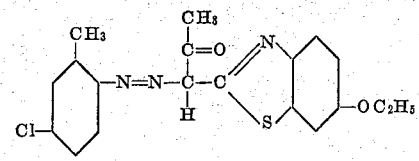

7. The compound represented by the formula

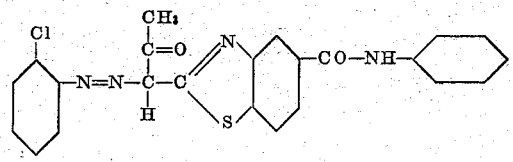

MAURICE ARTHUR THOROLD ROGERS.
WILFRED ARCHIBALD SEXTON.

CERTIFICATE OF CORRECTION.

Patent No. 2,282,379. May 12, 1942.

MAURICE ARTHUR THOROLD ROGERS, ET AL.

It is hereby certified that error appears in the printed specification of the above numbered patent requiring correction as follows: Page 2, line 9, in the table, for "5-chloro" read --6-chloro--; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.